United States Patent [19]
Theis

[11] Patent Number: 4,539,436
[45] Date of Patent: Sep. 3, 1985

[54] PROGRAMMED CONVERSATION RECORDING SYSTEM

[76] Inventor: Peter F. Theis, 3203 Bayview La., McHenry, Ill. 60050

[21] Appl. No.: 334,243

[22] Filed: Dec. 24, 1981

Related U.S. Application Data

[63] Continuation-in-part of Ser. No. 856,105, Nov. 30, 1977, Pat. No. 4,328,396, which is a continuation-in-part of Ser. No. 605,240, Aug. 18, 1975, , which is a continuation-in-part of Ser. No. 604,930, Aug. 15, 1975, , and Ser. No. 439,445, Feb. 4, 1974.

[51] Int. Cl.³ .............................................. H04M 1/64
[52] U.S. Cl. .................................. 179/6.04; 179/6.03; 179/6.14; 369/50; 360/12
[58] Field of Search ..................... 179/6.04, 6.05, 6.06, 179/6.09, 6.14, 6.17, 6.03; 360/12; 369/50

[56] References Cited
U.S. PATENT DOCUMENTS

| | | |
|---|---|---|
| 3,426,339 | 2/1969 | Rich et al. ......................... 340/174.1 |
| 3,550,289 | 12/1970 | Orita ...................................... 369/50 |
| 3,594,505 | 7/1971 | Price ..................................... 179/1 B |
| 3,641,507 | 2/1972 | Kosaka et al. ................... 340/172.5 |
| 3,662,121 | 5/1972 | Cruger .......................... 179/100.2 S |
| 3,694,811 | 9/1972 | Wood .............................. 340/152 R |
| 3,708,891 | 1/1973 | Rosov ..................................... 35/9 A |
| 3,721,774 | 3/1973 | Yonemoto ............................. 360/61 |
| 3,747,228 | 7/1973 | Yamamoto ............................ 360/12 |
| 3,810,316 | 5/1974 | Lahlou ................................. 35/8 A |
| 3,935,390 | 1/1976 | Winterhalter ...................... 179/6.14 |

Primary Examiner—Alan Faber
Attorney, Agent, or Firm—Willian Brinks Olds Hofer Gilson & Lione Ltd.

[57] ABSTRACT

A programmed conversation recording system utilizes distinctive control signals to condition voice actuated circuitry to respond to silence intervals, pause intervals, and speech length intervals to select and start the appropriate prerecorded message for creating a facsimile of a live conversation with an unrehearsed and untrained respondent.

13 Claims, 2 Drawing Figures

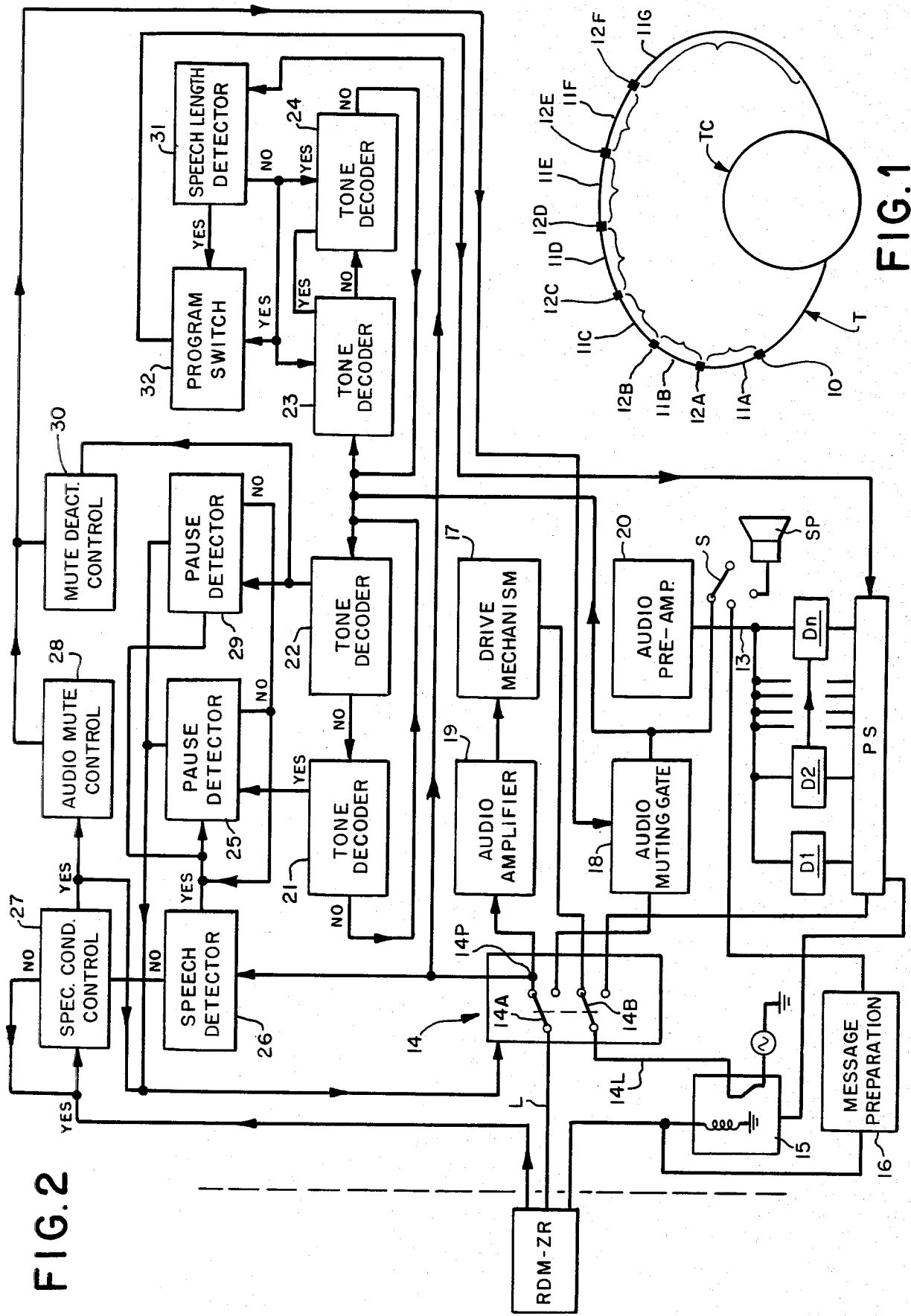

PROGRAMMED CONVERSATION RECORDING SYSTEM

RELATED APPLICATIONS

This application is a continuation-in-part of pending U.S. application Ser. No. 856,105 filed on Nov. 30, 1977, now U.S. Pat. No. 4,328,296, which was a continuation-in-part of U.S. application Ser. No. 605,240 filed Aug. 18, 1975, which was a continuation-in-part of U.S. applications Ser. No. 439,445 filed on Feb. 4, 1974 and Ser. No. 604,930 filed on Aug. 15, 1975.

SUMMARY OF THE INVENTION

The present invention provides a system wherein a selected set of control tones and pre-recorded message sections stored are played out in a sequence so that the control signals associated with each message section determine a response sequence that is particularly suited to the message. The system uses voice actuated equipment for responding to the silence, speech length and speech pauses of the user in accordance with the particular control signal that governs that section of the conversation.

More specifically, the invention provides a telephone answering system wherein successive message sections are placed on a tape or a combination of tapes, usually to ask the caller a series of questions, with a delay time between the questions operated by voice actuated circuitry. The delay time between questions is programmable by the cooperation of control signals and voice actuated circuitry and can be varied depending on the caller's anticipated reply pattern. The voice actuated circuitry has the capability of varying the pause length under program control.

The presently preferred embodiment provides a long delay prior to speech sensing and thereafter switches to pause sensing under program control. When an anticipated response does not occur, the preferred embodiment provides for advancing the program playout, with muting thereof, until a special condition control signal is sensed.

Another feature of the invention involves the use of a superimposed control signal in conjunction with a plurality of separate pre-recorded programs to provide for switching to a separate program or other control function upon the occurrence of a particular response characteristic.

Other features and advantages of the invention will be apparent from the following description and claims and are illustrated in the accompanying drawings which show structure embodying preferred features of the present invention and the principles thereof, and what is now considered to be the best mode in which to apply these principles.

BRIEF DESCRIPTION OF THE DRAWINGS

In the accompanying drawings forming a part of the specification, and in which like numerals are employed to designate like parts throughout the same:

FIG. 1 is a diagram showing an outgoing message recording having a continuous tape loop provided with a pre-recorded set of signals and announcements particularly suited to facilitate a programmed conversation with a caller; and FIG. 2 is a block diagram of a control circuit for connection to the recorder unit and to a telephone system to effect an automatic sequence of announcements to the caller and recording of the caller's responses.

DESCRIPTION OF PREFERRED EMBODIMENT

General Mode Of Operation

Referring now to the drawings, the general sequence of operation of the announcement function of the present system in the case of a typical automatically programmed conversation is summarized with reference to the pre-recorded continuous loop tape T which, as shown in FIG. 1, is associated with a tape cartridge TC for insertion into a tape deck.

The pre-recorded tape T is shown provided with a foil tab 10 followed by specific pre-recorded messages provided on tape regions 11A to 11F arranged to create a facsimile of a live conversation with the caller. The tape region 11G contains a "special condition" message. Between the message sections, the tape is provided with pre-recorded control signals 12A to 12F, each being of a fixed frequency or of a fixed length or of some fixed parameter having a value in accordance with the control function required at that particular location in the sequence.

In the case of the continuous loop, the foil tab 10 serves to indicate both the beginning and end of the program, but the tape need not be continuous and recorded or otherwise stored signals may substitute for the tab's function.

In addition, the control signal may specify that if a particular response or speech interval is shorter than a specified interval, the system should switch to a separate and different pre-recorded tape or other function. In addition, any of the other control signals may be stored in memory banks rather than being on the same tape as the message segments.

Typical control functions determined by the values of the control signals are:

(a) a pause interval, namely the interval following the completion of a response; for example, a 6 KH$_z$ tone (hereafter referred to as frequency (A) may denote a pause of two seconds and a 5 KH$_z$ tone (hereafter referred to as frequency (B) may denote a pause of nine seconds;

(b) a superimposed signal, for example, an 8 KH$_z$ tone to indicate that if the response is of less than five seconds duration, the system will switch to a separate and different program tape.

The use of tones of these frequency values is because existing telephone equipment will not transmit them to the caller. This system does not require a tone signal following the message section to tell a caller when to respond.

When "silence" is used herein, it has the usual meaning in this art, namely absence of speech.

The tone 12A that follows the first message section 11A signals the system that the first outgoing message region 11A is completed and sequences the system to record an incoming response. If an incoming response is not received in a pre-set interval, typically ten seconds, the pre-recorded tape will advance without playing outgoing messages from sections 11B to 11F until it detects a special condition control signal 12F.

If an incoming response is sensed within a pre-determined interval, for example, ten seconds, the system will continue recording until a pause (a period of relative silence) of pre-determined length is sensed. The duration of the pause is controlled by the control signal 12A. When that pause is sensed the pre-recorded tape T will play message segment 11B and the incoming message recording is terminated.

The sequence continues until the foil tab 10 is reached or the following occurs: if control signal 12A or a subsequent control signal includes a superimposed signal, the system will be conditioned, depending upon the particular response length, to switch to a separate program while advancing the original program to the foil tab 10.

It will thus be seen that the system employs a unique interaction between the content of the message sections, the time for a response to begin, the length of the response, and the pause following the response so that under automatic program control and voice actuated sequencing, a facsimile of a live conversation can be achieved, with the responses being recorded for subsequent processing. In addition, the system provides the option to switch to a different program where the response indicates the need.

The system finds important application to a number of existing telephone operations, including, particularly:
 (a) commercial order taking where a substantial amount of detailed information is required;
 (b) market research questionnaires;
 (c) various education, training and testing programs;
 (d) computer data collection.

The system has a number of applications that do not utilize the telephone system, for example, any of items (b), (c) and (d) above.

Specific Description of a Telephone Answering Application

The circuit arrangement and connections for a typical system, as shown in FIG. 2, are arranged to connect to a telephone interface arrangement such as an RDM-ZR installed by the telephone company. The system, as shown herein, includes one or a number of program decks D1, D2, etc. that are shown connected to a tape deck power sequencer PS. Each tape deck includes a head assembly for recording and playback from a tape T of the type shown in FIG. 1 and has its input/output connected to a common audio line 13.

The telephone interface RDM-ZR has an audio line L connected to an upper contact 14A of a control means 14 that includes ganged switch contacts 14A, 14B shown in incoming message mode position. A cycle start unit 15 which may be a conventional latching relay is connected either to be activated by a message preparation unit 16, such as a toggle switch on a microphone, that is used for initially recording a tape T or to be activated by the ring-up circuit from the RDM-ZR. A three-position switch S is shown in the normal operating position. The switch S can also be set to receive output from the preparation unit 16 for initially preparing a pre-recorded message and signal program for each deck D1, D2 . . . Dn. Finally, the switch S can be set to play back a program to a speaker SP.

When the control means 14 is in the incoming message mode as shown, it applies power over line 14L and switch contact 14B to a drive mechanism 17 for an incoming message tape deck. Correspondingly, the audio line L from the recorder coupler RDM-ZR is connected through switch contact 14A to a junction point 14P. The junction point 14P connects audio to a combined audio amplifier and tape deck system 19 that is powered by the drive mechanism 17 for recording the responses of the caller.

When the control means 14 is switched to the outgoing message mode, it applies power over line 14L and switch contact 14B to drive the tape deck power sequencer PS which applies power to the proper program tape deck D1–Dn. Correspondingly, the audio line L is connected through the audio muting gate 18, which may be a SPST relay or transistor switch, to the output of an audio pre-amplifier and amplifier system 20 which receives input from the proper program deck D1–Dn.

Boxes 17, 19, 25, 26, 27, 29 and 31 are inactive during the outgoing message mode.

The cycle start unit 15, upon being activated by an incoming cell, causes power to be applied to D1 and causes the RDM-ZR to seize the telephone line. The first message 11A on deck D1 is played through the audio pre-amplifier and amplifier system 20 and the then inactive audio muting gate 18 to the calling party.

When the first control signal 12A is played through audio pre-amplifier and amplifier system 20, it is applied to decoding means, such as a conventional band pass filter, which includes a set of tone decoders 21, 22, 23, 24. If the tone has a frequency A, it will trigger tone decoder 21 and apply a trigger through its YES terminal to activate a logic circuit 25 that acts as a pause detector. The YES terminal of tone decoder 21 is also connected to cause the control switch 14 to disconnect the program deck Di and apply power to the incoming message tape drive mechanism 17. Audio line L is switched to the audio amplifier 19 for recording the response. The incoming audio is also connected from junction 14P to a speech detector 26 which may be a conventional voice actuation circuit, which is for sensing silence (absence of speech) intervals preceding an incoming message. It may be noted that "speech interval" as used herein and "pause interval" may be considered as a speech void.

The special condition control 27 is a conventional resettable electronic timer having an output after a pre-determined period. The output of special condition control 27 is reset by the RDM-ZR when the RDM-ZR returns the line to an on-hook condition. Considering the alternative wherein no speech is detected, typically within ten seconds (as pre-set in the special condition control 27), the special condition control 27 is activated thereby activating an audio muting control 28 which in conjunction with muting deactivation control 30 is a conventional set/reset flip-flop, thereby activating the audio muting gate 18.

Additionally, the special condition control 27 will cause the control switch 14 to revert to the outgoing message mode; however, because the audio muting gate 18 is active, no audio can be transmitted from amplifier 20 to the calling party. The program deck D1 is re-energized and continues to play the pre-recorded program until tone decoder 22 is activated.

When the deck D1 plays a tone having the frequency B, it will trigger tone decoder 22 and apply a trigger to its YES terminal which energizes or rests the muting deactivation control 30, thereby activating the audio muting gate 18 to permit sound transmission to the caller, and which returns the system to normal operation in the outgoing message mode.

Considering the other alternative wherein the speech detector 26 does detect speech within ten seconds, that is, prior to the time when special condition control 27 would time out, its YES terminal triggers pause detector 25. If, subsequently, the YES terminal of speech detector 26 is off for two seconds, the pause detector 25 will cause the control switch 14 to revert to its outgoing message mode. This cycle will progress until the end of the tape is reached.

The system includes provisions for responding to the length of the live speech interval for selecting the subsequent message content. Each of tone decoders 23, 24 is responsive to a particular superimposed control signal to operate in conjunction with a speech length detector 31 for controlling a logic circuit serving as a program switch 32 that is connected to the power sequencer PS which could be a stepping switch circuit or a conventional electronic shift register circuit to act as a program switch control. The speech length detector 31 consists of a voice detection circuit and an electronic timer. The electronic timer will activate the program switch 32 causing the power sequencer PS to shift. When the YES terminal of one of decoders 23, 24 and the YES terminal of speech length detector 31 are activated, the program switch 32 will cause the power sequencer to switch from the previously active program deck to start a separate program deck.

If a tone A includes a superimposed tone A-1 that is recognized at any point, the previously described sequence will be the same except that tone decoder 23 will also be energized. If speech length detector 31 detects speech for a period typically less than five seconds, the program switch 32 will cause the power sequencer PS to activate the switch power to the next deck D2 and cause deck D1 to run until foil tab 10 is reached.

If speech length detector 31 receives speech for more than five seconds, its NO terminal causes reset of tone decoder 23.

If tone B includes a superimposed tone B-1 that activates tone decoder 24, a similar sequence occurs.

When all program tape decks D1 . . . Dn that may have been started, have recycled to the foil tab 10, the system cycle is completed and the cycle start will be unlatched.

Typical Sequence of Operations

1. An incoming call is detected by the telephone company interface RDM-ZR. This in turn signals the cycle control unit 15 and causes the system to start its cycle. Concurrently, the cycle control unit 15 causes the RDM-ZR to seize and complete the telephone line connection.

2. The control switch 14 is normally in the outgoing mode position. Program deck D1 will begin playing the first message 11A, such as "May we help you?", through the audio pre-amplifier and amplifier 20 and the de-activated audio muting gate 18. Following this message on the program tape, and recorded on the tape at the same time as the program was recorded is a control tone 12A. This control tone A is sensed by the tone decoder 21.

3. Tone decoder 21 causes the control switch 14 to switch to the incoming message position. When in this position, the program tape deck D1 is inactive and the incoming tape drive mechanism 17 is powered and the audio amplifier 19 is active.

4. The caller will respond with an answer such as "I would like to place an order". This will be recorded on the tape deck system included in audio amplifier 19. This incoming message will also be sensed by the speech detector 26. When the incoming response stops, a continuous signal will be sent to the pause detector 25 which has previously been activated by the tone detector 21. When a two second pause is detected in the speech by the pause detector 25, the control switch 14 will revert to the outgoing message position and program deck D1 will start with the next message segment 11B.

5. The next question might ask for the caller's name, repeating the sequence of steps 2 through 4. This sequence may be repeated several times as various questions are asked in message segments 11C, 11D, etc.

6. The question "What is your charge account number?" might typically be asked. In this case, as an example, the caller must go get his charge number so an immediate response may not be forthcoming. The speech detector 26 will not be activated until speech is sensed. This prevents the system from proceeding to the next question even though the lapse in speech is longer than two seconds prior to giving a response. Once the caller has responded, the speech detector is activated and the two second pause will be sought.

6A. If the caller did not respond at all within a reasonable period, typically ten seconds, the special condition control 27 is activated. This causes the audio muting control 28 to activate thereby energizing the audio muting gate 18. The control switch 14 is switched to the outgoing message position. Thus, the program tape D1 will restart but the caller will not hear the program because the audio muting gate 18 will block audio to the caller.

6B. When the program reaches the position 12F, a second tone B is sensed by the tone detector 11, the muting deactivation control 30 is energized, thereby de-activating the audio muting gate 18. Thus, the calling party will start hearing the outgoing message; for example, "Your call is being terminated. If your order is not complete, plase call again and answer each question as it is asked." Additionally, the special condition control 27 will be activated causing the system to revert to normal operation. Normally, this feature is used to tell a calling party that has been inadvertently cut off to call back again. It can also be used to automatically sequence the system to an entirely different part of the program tape.

7. If the program proceeds normally as described in step 6, when the program reaches each tone position, each control tone is sensed by a tone detector to cause the control switch 14 to switch to the incoming message position. When in this position, the program tape deck D1 is inactive and incoming tape deck circuits of audio amplifier 19 and drive mechanism 17 are active.

8. During normal operation of the program, if the caller responds with an indefinite answer such as "Let me think now", followed by a longer pause before making a further response, this is recorded on incoming message tape units of audio amplifier 19 and drive mechanism 17. The incoming message is also sensed by the speech detector 26. When the speech stops, a signal is sent from the speech detector 26 to the pause detector 29 which has previously been activated by the tone detector. When a pause, typically set at from six to ten seconds, is sensed by the pause detector 29, the control switch 14 will revert to the outgoing message position and program deck D1 will start with the next message segment 12E.

9. If the control tone being sensed has a second signal superimposed thereon and is sensed by tone decoder 23, the system will also evaluate the duration of the speech period. Thus, for an outgoing message such as "If you need operator assistance, please ask for the operator;

otherwise your order will be taken automatically if you will start by giving us your complete address", if the caller said "Operator", there would be less than five seconds of speech, and speech length detector 31 would cause the program switch 32 to cause the tape deck sequencer to shift to a second program deck D2 to change the outgoing message to that appropriate for the short answer "Operator".

9A. If the caller answers by stating a complete address, there would be more than five seconds of speech so that the speech length detector 31 is not activated. This longer answer will not cause the program deck sequencer to change program decks but deck D1 will continue with the in-line program.

10. When the foil tab 10 is sensed electrically, that tape deck is stopped. When all program decks have been stopped by the foil tab, the cycle is complete and the system is ready to accept the next incoming call.

The time intervals given herein are suited to a number of commercial order taking programs but are not intended to limit the scope of the invention. Each type of interval described herein may have either a greater time or lesser time depending upon the particular situation.

Summary

In the case of the preferred embodiment disclosed and described herein; the mode control means consist of the control switch 14; the means for storing a program is shown at D1–Dn; the means for playing the program is shown at 18, 20; the means for initiating operation of the means for playing is shown at 15; the decoding means is shown at 21, 22; the means for recording incoming messages is shown at 17, 19; and the speech detecting means is shown at 26. Interval detecting means, that is, means for detecting speech void are shown at 25 or 29.

In the disclosed embodiment, intended particularly for telephone applications, detection of silence intervals is important for initiating a sequence leading to automatic cut-off. This is important for insuring return of the equipment to a condition for receiving another call in the event the first call does not proceed to normal completion.

In non-telephone applications or in continuously monitored telephone answering applications, it is sometimes practical to eliminate the separate silence interval detection function. For example, the system may utilize a single detector of speech voids wherein the boxes 26, 27 are set to detect any speech void of pre-determined length occurring at any time during the incoming message mode. Such a simplified system is characterized at playing the control signal, that effects switching from outgoing to incoming message mode, substantially immediately following playing of the outgoing message section, thereby creating the environment of live conversation.

It is also contemplated that a silence interval detection, as described, can be provided where the program merely advances to the next message section to continue the sequence rather than to advance to the special condition function.

Thus, while preferred constructional features of the invention are embodied in the structure illustrated herein, it is to be understood that changes and variations may be made by those skilled in the art without departing from the spirit and scope of the appended claims.

What is claimed is:

1. Apparatus for carrying on a programmed telephone conversation with a respondent via a telephone line adapted to carry a voice communication of the respondent, the apparatus including means having a plurality of pre-recorded messages which are playable in sequence in response to a corresponding response from the respondent, and further comprising:
   interface means for coupling said apparatus to the telephone line;
   a speech detector coupled to the interface means;
   detecting means, coupled to said speech detector, for detecting a pause in said voice communication of the respondent;
   means, responsive to said pause, for causing the sending of the next pre-recorded message;
   means, coupled to said speech detector, for detecting a lack of response from the respondent to a pre-recorded message; and
   means responsive to said lack of a response, for also altering the course of said programmed telephone conversation.

2. Apparatus for carrying on a programmed telephone conversation with a respondent via a telephone line adapted to carry a voice communication of the respondent, the apparatus including means having a plurality of pre-recorded messages which are playable in sequence in response to a corresponding response from the respondent, and further comprising:
   interface means for coupling said apparatus to the telephone line;
   a speech detector, coupled to said interface means to monitor the voice communication;
   detecting means, coupled to said speech detector, for detecting a pause in said voice communication of the respondent;
   means, responsive to said pause, for causing the sending of the next pre-recorded message;
   means, coupled to said speech detector, for detecting a lack of response from the respondent to a pre-recorded message; and
   means responsive to said lack of a response for causing the recycling of said pre-recorded messages to a beginning point.

3. Apparatus for carrying on a programmed telephone conversation with a respondent via a telephone line adapted to carry a voice communication of the respondent, the apparatus including means having a plurality of pre-recorded messages which are playable in sequence in response to a corresponding response from the respondent, and further comprising:
   interface means for coupling said apparatus to the telephone line;
   a speech detector coupled to the interface unit to monitor the voice communication;
   first timer means, coupled to said speech detector, for timing a pause exceeding a first predetermined duration in said voice communication of the respondent;
   means responsive to said first timer means for causing the playing of the next pre-recorded message after said first predetermined duration;
   second timer means, coupled to the speech detector, for timing an absence of said voice communication of the respondent exceeding a second predetermined duration greater than said first predetermined duration, subsequent to the playing of a pre-recorded message; and means responsive to said second timer means for altering the course of said programmed telephone conversation.

4. The apparatus defined in claim 3 further comprising means, responsive to the termination of said prerecorded messages, for preventing the next pre-recorded message from being played until after a pause in the respondent's response exceeds said first predetermined duration.

5. Apparatus for carrying on a programmed telephone conversation with a respondent via a telephone line adapted to carry a voice communication of the respondent, the apparatus being characterized by an incoming mode in which said voice communication from said respondent can be passed into said apparatus, and an outgoing mode in which an audio program containing a plurality of pre-recorded messages playable in sequence can be passed to said respondent, comprising:
   interface means for coupling said apparatus to the telephone line;
   means, coupled to said interface means, for changing the apparatus to an incoming mode at the end of each of said prerecorded messages;
   a speech detector coupled to monitor the voice communication on the telephone line;
   pause response means coupled to the speech detector and operable to produce, after a pause in said voice communication exceeds a first predetermined duration, a signal to change said apparatus from said incoming mode to said outgoing mode; and
   lack of response means, coupled to the speech detector and adapted to alter the course of said programmed telephone conversation when the interval prior to the commencement of a response to any of said pre-recorded messages exceeds a predetermined second duration substantially greater than said first duration.

6. The apparatus defined in claim 5 further comprising second pause response means, coupled to the speech detector and operable to produce after a pause in the voice communication of a duration different from said first predetermined duration, a signal to change said apparatus from said incoming mode to said outgoing mode; said second pause response means active following only selected ones of said plurality of prerecorded messages.

7. The apparatus defined in claims 1, 2, 3 or 5 further comprising:
   storage means, having a first component for storing an audio program comprising said pre-recorded messages; and a second component for storing an additional audio program containing at least one additional outgoing message, said first component and said second component being coupled to said interface means;
   means for producing a response duration signal when the duration of the respondent's response to a designated one of the prerecorded messages exceeds a predetermined time period;
   component selection means coupled to said storage means for causing reproduction of said additional message stored in said second component to said interface means upon receipt of said response duration signal.

8. Apparatus for carrying on a programmed telephone conversation with a respondent via a telephone line adapted to carry a voice communication of the respondent, the apparatus being characterized by an incoming mode in which said voice communication from said respondent can be passed into said apparatus, and an outgoing mode in which an audio program containing a plurality of pre-recorded messages playable in sequence can be passed to said respondent, comprising:
   interface means for coupling said apparatus to the telephone line;
   a speech detector coupled to monitor said voice communication on said telephone line;
   first pause detection means, coupled to said speech detector, for changing said apparatus from the incoming mode to the outgoing mode after a pause in said voice communication of a first predetermined duration;
   second pause detection means, coupled to said speech detector, for changing said apparatus from the incoming mode to the outgoing mode after a pause in said voice communication of a second predetermined duration different from said first predetermined duration; and
   means for rendering said first pause response means operable after a first one of said pre-recorded messages has been played, and for rendering said second pause response means operable after a second one of said pre-recorded messages has been played.

9. The apparatus defined in claim 8 further comprising decoder means for identifying the termination of said pre-recorded messages; and, when a respondent does respond to one of said pre-recorded messages, means, responsive to said decoder means for preventing the next pre-recorded message from being played until after a pause in the respondent's response exceeding said first predetermined duration when said first pause detection means are operable, and for preventing the next pre-recorded message from being played until after a pause in the respondent's response exceeding said second predetermined duration when said second pause detection means are operable.

10. Apparatus for carrying on a programmed telephone conversation with a respondent via a telephone line adapted to carry a voice communication of the respondent, the apparatus being characterized by an incoming mode in which said voice communication from said respondent can be passed into said apparatus, and an outgoing mode in which an audio program containing a plurality of pre-recorded messages playable in sequence can be passed to said respondent, comprising:
   interface means for coupling said apparatus to the telephone line;
   a speech detector coupled to the interface means to monitor the voice communication on said telephone line;
   means, coupled to the speech detector, for detecting a pause in said voice communication of a predetermined duration;
   means responsive to said pause for substantially instantaneously switching said system to said outgoing mode to reproduce the next of said pre-recorded messages; and
   means responsive to the termination of each of said pre-recorded messages for substantially instantaneously switching said system to said incoming mode.

11. The apparatus defined in claim 10 wherein said pre-determined duration is less than six seconds.

12. Apparatus for carrying on a programmed telephone conversation with a respondent via a telephone line adapted to carry a voice communication of the respondent comprising:
- interface means for coupling said apparatus to the telephone line;
- first means for reproducing a first audio program having a plurality of pre-recorded messages which are playable in sequence in response to said voice communication;
- a speech detector coupled to the telephone line to monitor the voice communication;
- means, coupled to the speech detector, for detecting a pause in the respondent's communication;
- means responsive to said pause for causing said first means to reproduce the next pre-recorded message;
- means for producing a response duration signal when the duration of the respondent's response to a designated one of the pre-recorded messages has a duration within a predetermined time period; and
- second means, for reproducing a second audio program having at least one pre-recorded message, upon production of said response duration signal.

13. Apparatus for carrying on a programmed telephone conversation with a respondent via a telephone line adapted to carry a voice communication of the respondent, the apparatus being characterized by an incoming mode in which said voice communication from said respondent can be passed into said apparatus, and an outgoing mode in which an audio program containing a plurality of pre-recorded messages playable in sequence can be passed to said respondent, comprising:
- interface means for coupling said apparatus to the telephone line;
- storage means, having a first component for storing an audio program containing a plurality of pre-recorded messages and component switching information; and a second component for storing an audio program containing at least one additional outgoing message;
- program reproduction means, coupled to said interface means and said first component and said second component, operable to reproduce said pre-recorded messages passed from said first component and said second component;
- a speech length detector coupled to the interface means to monitor the voice communication;
- means responsive to the speech length detector, for producing a response duration signal when the duration of the respondent's response to a selected one of the pre-recorded messages exceeds a predetermined time period;
- component selection means, coupled to said storage means, for causing passage of said pre-recorded messages stored in said second component to said reproduction means for reproduction upon receipt of said response duration signal, and for causing passage of said pre-recorded messages stored in said first component to said reproduction means in the absence of said response duration signal;
- a speech detector coupled to the interface means to monitor the voice communication;
- means, responsive to the speech detector, for detecting a pause in the caller's communication; and
- means responsive to said pause for operating said program reproduction means.

* * * * *